United States Patent
Boldt et al.

(10) Patent No.: US 10,612,442 B2
(45) Date of Patent: Apr. 7, 2020

(54) EXHAUST GAS TREATMENT DEVICE FOR AN INTERNAL COMBUSTION ENGINE OF A MOTOR VEHICLE

(71) Applicant: Daimler AG, Stuttgart (DE)

(72) Inventors: Thomas Boldt, Neu-Ulm (DE); Johannes Gerhard, Esslingen (DE); Thomas Hermann, Waiblingen (DE); Michael Hochholzner, Nellingen (DE); Sinisa Kontin, Stuttgart (DE); Tilmann Oestreich, Korntal-Muenchingen (DE); Andreas Petry, Affalterbach (DE); Emmanuel Routier, Stuttgart (DE); Benedikt Stute, Heimsheim (DE)

(73) Assignee: Daimler AG, Stuttgart (DE)

( * ) Notice: Subject to any disclaimer, the term of this patent is extended or adjusted under 35 U.S.C. 154(b) by 216 days.

(21) Appl. No.: 15/738,868

(22) PCT Filed: Aug. 22, 2016

(86) PCT No.: PCT/EP2016/001415
§ 371 (c)(1),
(2) Date: Dec. 21, 2017

(87) PCT Pub. No.: WO2018/036600
PCT Pub. Date: Mar. 1, 2018

(65) Prior Publication Data
US 2020/0040792 A1 Feb. 6, 2020

(51) Int. Cl.
*F01N 3/28* (2006.01)
*F01N 13/00* (2010.01)

(52) U.S. Cl.
CPC .......... *F01N 3/2892* (2013.01); *F01N 13/00* (2013.01); *F01N 2490/06* (2013.01); *F01N 2610/02* (2013.01); *F01N 2610/1453* (2013.01)

(58) Field of Classification Search
CPC .... F01N 3/2892; F01N 13/00; F01N 2490/06; F01N 2610/02; F01N 2610/1453
See application file for complete search history.

(56) References Cited

U.S. PATENT DOCUMENTS

| 8,726,640 B2 | 5/2014 | Tilinksi et al. |
| 2008/0163612 A1* | 7/2008 | Gaiser ............... F01N 3/025 60/299 |

(Continued)

FOREIGN PATENT DOCUMENTS

| CN | 102071994 A | 5/2011 |
| CN | 103154457 A | 6/2013 |

(Continued)

OTHER PUBLICATIONS

Chinese Office Action issued in Chinese counterpart application No. 201680035951.X dated Jul. 3, 2019, with partial English translation (Nine (9) pages).

(Continued)

*Primary Examiner* — Patrick D Maines
(74) *Attorney, Agent, or Firm* — Crowell & Moring LLP

(57) ABSTRACT

An exhaust gas treatment device includes an exhaust gas guide element which has an exhaust gas conduit. A first flow separation element is disposed in the exhaust gas conduit that divides the exhaust gas conduit into a first partial conduit and a second partial conduit. The first flow separation element has a first conduit area. A second flow separation element is disposed in the second partial conduit. The second flow separation element divides the second partial conduit into a first sub-conduit, a second sub-conduit, and a third sub-conduit. The second flow separation element has a second conduit area which is cylindrical or expands in a flow direction. The first conduit area of the first flow separation element expands along an injection direction of a reductant.

11 Claims, 8 Drawing Sheets

(56) References Cited

U.S. PATENT DOCUMENTS

| | | |
|---|---|---|
| 2010/0005791 A1 | 1/2010 | Ranganathan et al. |
| 2015/0167525 A1* | 6/2015 | Assalve ............... F01N 3/208 60/295 |
| 2016/0047288 A1* | 2/2016 | Arrowsmith ......... B01F 5/0473 60/274 |
| 2016/0265409 A1* | 9/2016 | Puschel ............... B01F 5/0062 |
| 2019/0186321 A1* | 6/2019 | Abbassi ............... F01N 3/2073 |

FOREIGN PATENT DOCUMENTS

| | | | |
|---|---|---|---|
| CN | 103573350 A | 2/2014 | |
| DE | 10 2009 053 950 A1 | 5/2011 | |
| EP | 2 884 069 A1 | 6/2015 | |
| WO | WO -2011045347 A1 * | 4/2011 | ........... F01N 3/2066 |
| WO | WO 2012/047159 A1 | 4/2012 | |

OTHER PUBLICATIONS

Japanese Office Action issued in Japanese counterpart application No. 2017-567765 dated Jan. 29, 2019, with partial English translation (Nine (9) pages).

* cited by examiner

EXHAUST GAS TREATMENT DEVICE FOR AN INTERNAL COMBUSTION ENGINE OF A MOTOR VEHICLE

BACKGROUND AND SUMMARY OF THE INVENTION

The invention relates to an exhaust gas treatment device for an internal combustion engine of a motor vehicle.

Such an exhaust gas treatment device for an internal combustion engine of a motor vehicle is already known from US 2010/0005791 A1. The exhaust gas treatment device comprises at least one exhaust gas guide element having at least one exhaust gas conduit, through which exhaust gas of the internal combustion engine can flow. The exhaust gas guide element is thus used to guide the exhaust gas.

The exhaust gas treatment device further comprises a metering device, by means of which a reductant for denitrifying the exhaust gas can be introduced in the exhaust gas conduit at at least one feeding point. Furthermore, a flow separation element arranged in the exhaust conduit is provided, by means of which the exhaust gas conduit is divided into a first partial conduit and a second partial conduit.

A first partial flow of the exhaust gas can flow through the first partial conduit, wherein a second partial flow of the exhaust gas can flow through the second partial conduit. In other words, the exhaust gas or an overall flow of the exhaust gas is divided into the first partial flow and the second partial flow by means of the flow separation element, wherein the first partial flow flows through the corresponding first partial conduit and the second partial flow flows through the corresponding second partial conduit. The flow separation element comprises a conduit area, through which the second partial flow can flow and which expands in the flow direction of the second partial flow, and so at least in this portion, the flow separation element is designed as a cone.

Furthermore, DE 10 2009 053 950 A1 discloses a device for the treatment of exhaust gases in an exhaust gas system of internal combustion engines. Once again, a metering device for introducing reductants is provided.

Finally, WO 2012/047159 A1 discloses an exhaust gas treatment device having an exhaust gas guide element, through which exhaust gas can flow, and a metering device, with which a reductant can be introduced into the exhaust gas guide element.

The reductant is used to denitrify the exhaust gas. This means that the exhaust gas of the internal combustion engine, which for example is designed as a diesel engine, can contain nitric oxides (NOx) which, at least to some extent, are removed or eliminated by means of the reductant. For that purpose, the nitric oxides can, for example, react with ammonia (NH3) from the reductant to form nitrogen and water. For example, this reaction takes place in the course of a selective catalytic reduction (SCR), particularly in an SCR catalytic converter, through which the exhaust gas mixed with the reductant can flow, and which can be a component of the exhaust gas treatment device.

Usually, the reductant is an aqueous solution, particularly an aqueous urea solution which is introduced, particularly injected, into the exhaust gas conduit, e.g., by means of the metering device. It has become apparent that deposits and particularly urea deposits particularly in the interior of the exhaust gas treatment device or the exhaust gas guide element can occur.

The present invention therefore addresses the problem of further developing an exhaust gas treatment device of the initially described type such that excessive deposits of the reductant can be prevented.

In order to further develop an exhaust gas treatment device such that excessive deposits of the reductant, i.e., particularly excessive urea deposits, can be prevented, a second flow separation element, according to the invention, is provided in the second partial conduit. With the second flow separation element, the second partial conduit is divided or split into a first sub-conduit, a second sub-conduit, and a third sub-conduit. A first sub-flow of the exhaust gas can flow through the first sub-conduit, wherein the second sub-flow of the exhaust can flow through the second sub-conduit. In addition, the third sub-flow of the exhaust gas can flow through the third sub-conduit. The above sub-flows are each further partial flows of the second partial flow which thus comprises the sub-flows. In other words, the second partial flow which flows through the second partial conduit is divided into the sub-flows by means of the second flow element, and so the exhaust gas or an overall flow of the exhaust gas is divided not only by the first flow separation element into the first partial flow and the second partial flow, but is also further divided by the second flow separation element into the sub-flows.

For that purpose, the second flow separation element comprises a conduit area, through which the second sub-flow and the third sub-flow can flow, and which expands in the flow direction of the second sub-flow and the third sub-flow.

Preferably, the reductant can be introduced into the exhaust gas conduit by means of the metering device by forming a spray cone, the cone angle of which is at least 20 degrees, particularly preferably at least 25 degrees, wherein the flow separation elements are arranged entirely or safely outside of the spray cone. This means that the spray cone—when it is introduced or injected into the exhaust gas conduit—does not quite touch the flow separation elements. In other words, none of the flow separation elements is arranged within the real spray cone, and so the spray cone does not collide with the flow separation elements.

By means of the flow separation elements, the exhaust gas or its flow is divided multiple times until it reaches the metering device, particularly its nozzle, i.e., the feeding point. It is the task or the purpose of the partial flows and/or sub-flows, guided to the nozzle and preferably symmetrically to a spray axis, to support the metered reductant, i.e., its spray, and to reliably transport it out of the area near the nozzle, thus preventing deposits in the area. The remaining partial flows and/or sub-flows are supposed to provide for a widespread distribution of the spray on walls in the area away from the nozzle in order to keep the surface load and thus the cooling on the walls low. Since the spray is not applied to the components near the nozzle, particularly the flow separation elements, the deposit risk is kept low. As a result, the metering rates, at otherwise similar operating conditions, can be significantly increased, when compared to conventional exhaust gas treatment devices.

The subsequent advantages are that deposits in the area near and away from the nozzle can be kept low or prevented, and a low, at least substantially homogenous surface load of walls, to which the reductant was possibly applied, can be facilitated. As a result, the cooling can be kept at a minimum, and so the metered reductant can evaporate particularly well. In particular, particularly high metering quantities of the reductant can be realized. In addition, the exhaust gas back pressure can be kept low, resulting in particularly low fuel consumption.

In particular, it is preferably provided that the cone angle of the spray cone is greater than 20 degrees. It has proven to be particularly advantageous, when the cone angle is in a range from 25 degrees through 120 degrees. For example, respective contours of the flow separation elements, particularly on the side of the inner circumference, which are designed as components or installation elements, cling to the cone angle, also called spray cone angle, and so the installation space requirements can be kept particularly low.

The metering device, particularly its possibly provided nozzle for introducing the spray cone into the exhaust gas conduit, is usually designed on the basis of a nominal cone angle of the spray cone. In a first application, the nominal cone angle of the spray cone is, for example, 40 degrees, wherein the nominal cone angle in a second application is, for example, 60 degrees. With a tolerance of the measuring methods for recording the cone angle, and a component tolerance of the metering device, particularly the nozzle, this results in an actual cone angle of the spray cone of 30 to 50 degrees in the first application, and an actual cone angle of 50 to 70 degrees in the second application. In other words, there is usually a tolerance of the cone angle of +/−10 degrees. In the second application with the nominal cone angle of 60 degrees, the cone angle is determined, for example, in addition to the tolerance of +10 degrees for the actual cone angle, by an additional+20 degrees, thus resulting in overall 90 degrees, and so the aforementioned components cling to this cone angle of 90 degrees. As a result, the components are with additional certainty not struck by the spray cone or spray drops of the spray cone. By taking into account the aforementioned tolerances, a sufficient distance of the components from the spray cone can thus be realized. In particular, this means that the components are definitely not struck by the spray cone.

Since the first conduit area expands, the first flow separation element or the first conduit area is designed as a cone. The second flow separation element or the second conduit area is also designed as a cone. By using not only the first flow separation element but also the second flow separation element, the overall flow of the exhaust gas can be divided multiple times, before the exhaust gas reaches the feeding point and thus reaches, for example, a nozzle, which is arranged at the feeding point, and with which the reductant is introduced into the exhaust gas guide element. The purpose of the sub-flows guided to the nozzle is particularly that of supporting the reductant. The spray cone is also called jet cone or simply jet or spray, and so the reductant is introduced into the exhaust gas guide element, while forming an at least substantially conical jet or spray which forms the spray cone. The sub-flows thus have the purpose of supporting the spray and reliably transporting it out of an area near the nozzle in order to prevent deposits of the reductant in the area. The remaining sub-flows and the first partial flow provide for a widespread distribution of the spray or the reductant at wall areas in areas away from the nozzle, in order to at least keep the so-called surface load and thus the cooling of the exhaust gas guide element at least low. As a result, the risk of deposits of the reductant can be kept particularly low.

At otherwise similar operating conditions, it is thus possible with the exhaust gas treatment device according to the invention to realize particularly high metering rates, when compared to conventional exhaust gas treatment devices, i.e., to introduce particularly great quantities of the reductant into the exhaust gas guide element without creating excessive deposits. Despite particularly high metering rates and low temperatures, a particularly advantageous urea concentration without or only very little deposit formation can be realized with the use of the second flow separation element. It is particularly possible to prevent deposits both in the areas near and away from the nozzle. Since the surface load of wall areas, to which the reductant is also applied, can be kept low, the cooling of the wall areas can also be kept low. This results in a particularly advantageous evaporation of the introduced quantity of reductant.

Due to the advantageous concentration of the reductant, which can be effected by means of the second flow separation element, the reductant being, for example, an aqueous urea solution, great quantities of the reductant can also be introduced in order to be able to denitrify the exhaust gas particularly well. It is particularly possible to realize a particularly advantageous mixing of the ammonia released by the reductant before it enters an SCR catalytic converter; as a result, particularly high conversions can be generated in the SCR catalytic converter (SCR—selective catalytic reduction). It is further advantageous that, despite the use of the second flow separation element and particularly its specific design, the exhaust gas back pressure can be kept low, and so the exhaust gas treatment device according to the invention allows for a particularly efficient operation, i.e., with low fuel consumption of the internal combustion engine. Therefore, the use of the second flow separation element has an at least almost neutral effect with regard to fuel consumption.

In an advantageous embodiment of the invention, at least one part of the exhaust gas conduit, through which the exhaust gas can flow, is volute-shaped. This means that at least one part of the exhaust gas conduit, particularly at least one of the partial conduits and/or at least one of the sub-conduits, has the shape of a spiral or a volute, and so at least this part tapers along its direction or along a direction, in which the exhaust gas flows through the volute-shaped part. Based on a state, in which the spray cone is introduced, particularly injected, into the exhaust gas conduit, at least this part of the exhaust gas conduit thus extends in a volute- or spiral-shaped manner in circumferential direction of the spray cone over its circumference.

It is further conceivable that at least one of the flow separation elements, particularly, the first flow separation element, has on its inner side a contour of a diffuser.

In a further advantageous embodiment, the second conduit area is at least to some extent arranged in the first conduit area. In other words, it is, for example, provided that the second conduit area protrudes at least to some extent into the first conduit area. As a result, a particularly advantageous flow separation and flow guidance of the exhaust gas can be realized, and so the risk of deposits can be kept particularly low.

It has proven particularly advantageous, when the reductant can be introduced, particularly injected, into the second conduit at an injection direction, wherein the conduit areas each expand along the injection direction. In other words, the injection direction coincides with a direction, in which the conduit areas expand. This means that each of the conduit areas has a passage direction, in which the exhaust gas can flow through the conduit areas. The corresponding passage direction coincides with the injection direction. Since the jet or the spray of the reductant, for example, reaches the conduit areas at least to some extent, the risk of deposits can be kept particularly low.

A further embodiment is characterized in that the reductant, while forming the spray cone (jet or spray), can be introduced into the second partial conduit along an imaginary straight line, which coincides with the injection direction, wherein the conduit areas each are arranged coaxially to the straight line. In other words, it is preferably provided that the straight line coincides with corresponding central axes of the conduit areas. As a result, an excessive deposit of reductants on wall areas can be prevented.

Since the jet or spray is at least substantially conical or frusto-conical, it is preferred that the imaginary straight line coincides with the central axis of the cone or frustum, i.e., with the central axis of the jet cone.

In a particularly advantageous embodiment of the invention, the first partial conduit is delimited by a first surface area of the first flow separation element, and a first part of an inner side of the exhaust gas guide element which faces the first surface area, wherein the second partial conduit is delimited by a second surface area of the first flow separation element which faces away from the first surface area, and a second part of the inner side of the exhaust gas guide element which faces the second surface area. As a result, a particularly advantageous flow separation can be realized, and so excessive deposits of the reductant can be reliably prevented. It is further possible to realize a particularly advantageous flow guidance, and so the exhaust gas back pressure in the exhaust gas treatment device can be kept low.

In order to realize a particularly advantageous flow guidance and flow separation, it is provided in a further embodiment of the invention that the first sub-conduit is delimited by a third part of the second surface area of the first flow separation element, and a third surface area of the second flow separation element which faces the third part, wherein the third sub-conduit is delimited by a fourth surface area of the second flow separation element which faces away from the third surface area, and a fifth surface area of the second flow separation element which faces the fourth surface area.

Furthermore, it has proven particularly advantageous if the second sub-conduit is delimited by a sixth surface area of the second flow separation element which faces away from the fifth surface area, and a partial area, facing the sixth surface area, of the second part of the inner side of the exhaust gas guide element. As a result, a particularly advantageous flow guidance and flow separation can be realized, and so excessive deposits can be prevented.

A further embodiment is characterized in that straight guide elements for guiding the exhaust gas are associated with the third sub-conduit. The straight guide elements are, for example, straight blades which are essentially designed so as to be plane or flat or planar, thus allowing for an at least substantially symmetrical inflow at the nozzle.

For realizing a particularly symmetrical inflow at the nozzle, it is, for example, possible to use a substantially vertical guide element, particularly in the form of a metal sheet.

In a further advantageous embodiment of the invention, curved guide elements are provided for effecting an at least substantially swirl-shaped flow of at least one part of the exhaust gas. By means of the curved guide elements which, for example, are designed as curved blades, a swirl-shaped flow can be applied to at least one part of the exhaust gas, and so an advantageous turbulence of the exhaust gas is presentable. Due to this turbulence, the exhaust gas can be mixed particularly well with the reductant, and so a particularly good processing of the reductant is generated. As a result, excessive deposits can be prevented.

It has been proven particularly advantageous if the curved guide elements are arranged in the second partial conduit. As a result, a swirled flow can be realized in the second conduit area, i.e., in the inner, second cone. The objective is that of preventing a detachment or a flow detachment in the inner cone despite the large opening angle of the inner cone.

In a further embodiment of the invention, at least one of the flow separation elements, particularly the first flow separation element, has on its inner side a contour of a diffusor with a first longitudinal area, which is tapered in flow direction of the corresponding partial flow or sub-flow, and an expanding second longitudinal area adjacent to the first longitudinal area in flow direction.

Further advantages, features, and details of the invention can be derived from the following description of a preferred embodiment and by means of the drawings. The features and combinations of features specified in the above description as well as the following features and combinations of features specified in the drawing descriptions and/or only shown in the drawings can not only be used in the specific combination described but also in different combinations or on their own without exceeding the scope of the invention.

DETAILED DESCRIPTION OF THE DRAWINGS

Figure 1:
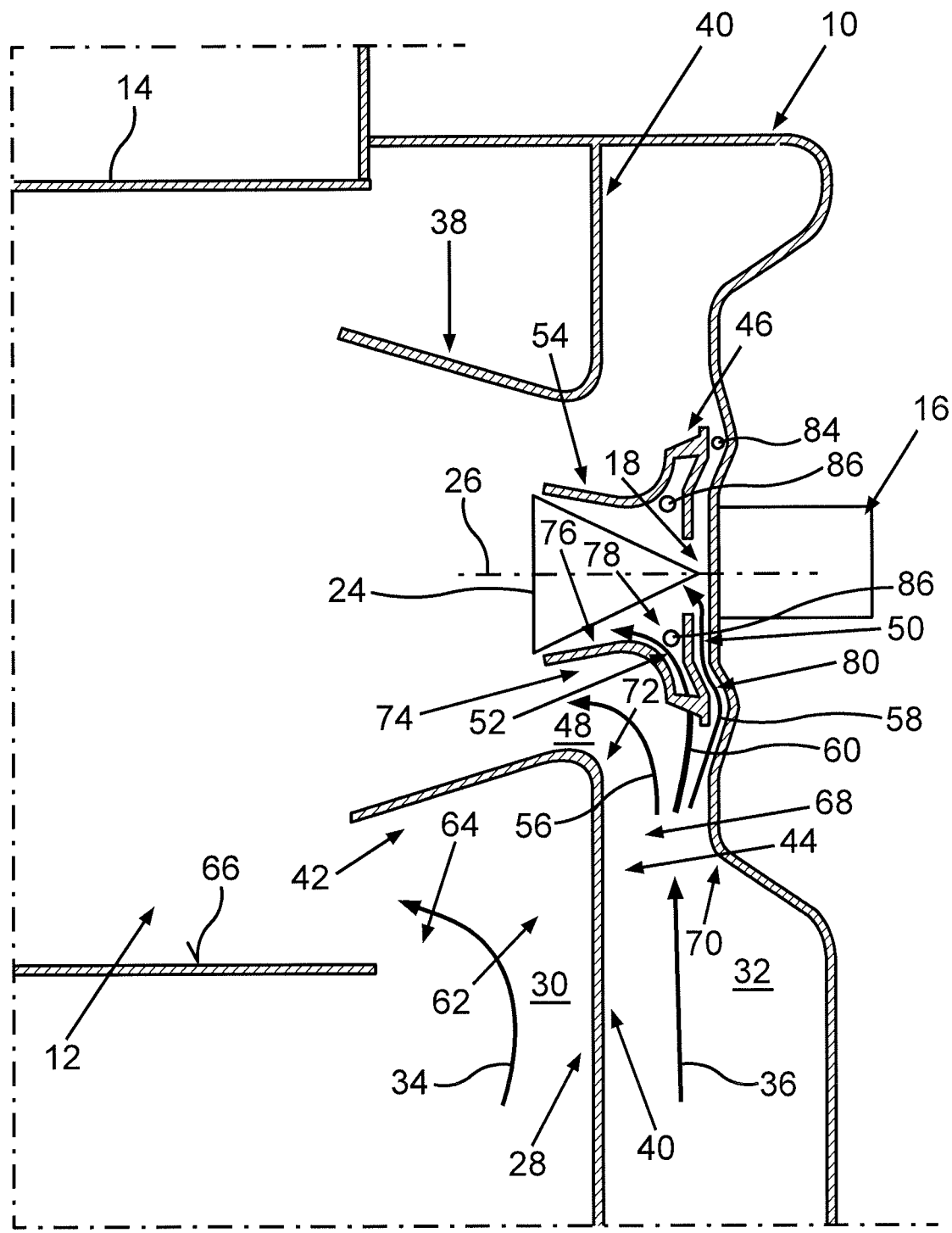
FIG. 1 shows a schematic cutaway view of an exhaust gas treatment device according to a first embodiment for an internal combustion engine of a motor vehicle, having an exhaust gas guide element which comprises at least one exhaust conduit, through which the exhaust gas of the internal combustion engine can flow, and in which a first flow separation element and a second flow separation element for the flow separation of the exhaust gas is arranged.

In the drawings, similar or functionally similar elements are denoted with the same reference signs.

FIG. 1 shows a schematic cutaway view of an exhaust gas treatment device according to a first embodiment for an internal combustion engine of a motor vehicle. The internal combustion engine, for example, is designed as a diesel engine and is used to drive the motor vehicle. The exhaust gas treatment device comprises at least one exhaust gas guide element 10, having at least one exhaust gas conduit, through which the exhaust gas of the internal combustion engine can flow and which in its entirety is denoted with 12. The exhaust gas conduit 12 extends into a mixing pipe 14 of the exhaust gas guide element 10, wherein the mixing pipe 14 is used particularly for mixing the exhaust gas with the reductant.

The exhaust gas treatment device further comprises a metering device 16, particularly schematically shown in FIG. 1, by means of which the reductant can be introduced, particularly injected, into the exhaust gas conduit 12 at at least one feeding point 18. The reductant is used to denitrify the exhaust gas. This means that by means of the reductant, nitric oxides (NOx) contained in the exhaust gas are at least to some extent removed from the exhaust gas. The reductant is, for example, an aqueous urea solution, from which ammonia (NH3) is released in the exhaust gas conduit 12 after its introduction into the exhaust gas conduit 12. The nitric oxides contained in the exhaust gas can react with the ammonia in the course of a selective catalytic reduction (SCR) to form nitrogen and water.

Figure 8:
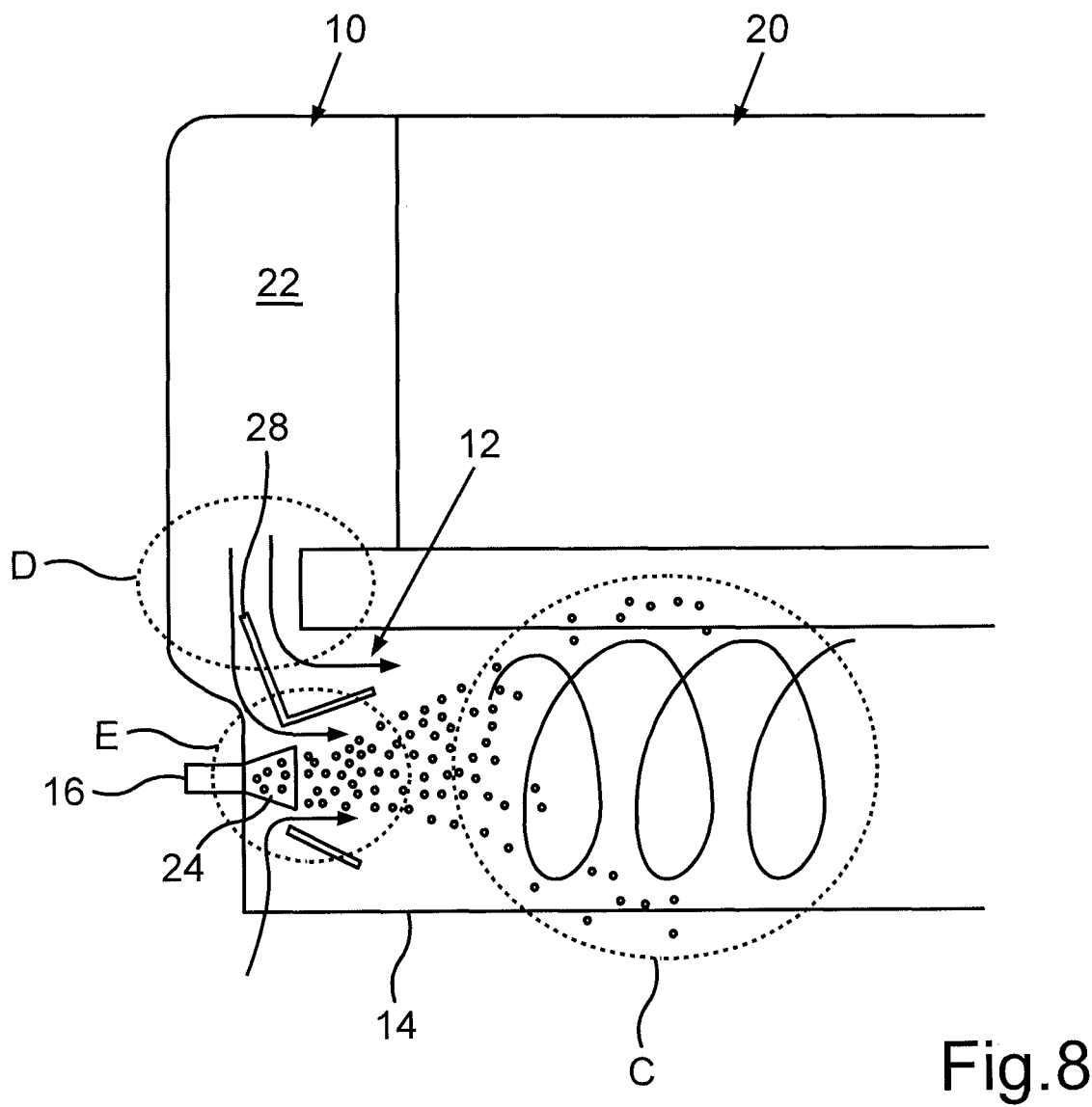
FIG. 8 shows a schematic cutaway view of the exhaust gas treatment device.

In conjunction with FIG. 8, it can be seen that upstream of the feeding point 18, a particle filter 20 is arranged, through which the exhaust gas can flow. Since the internal combustion engine is presently designed as a diesel engine, the particle filter 20 is a diesel particle filter (DPF). The particle filter 20 is followed by a collecting chamber 22, in which the exhaust gas can be collected. The exhaust gas can subsequently flow from the collecting chamber 22 into the mixing pipe 14, which will be explained in more detail below. The particle filter 20 is used to filter particles and particularly soot particles from the exhaust gas.

At least one SCR catalytic converter of the exhaust gas treatment device, for example, is arranged downstream of the feeding point 18 and particularly downstream of the mixing pipe 14. By means of the SCR catalytic converter, through which the exhaust gas and the reductant, metered or introduced into the exhaust gas, can flow, a selective catalytic reduction is effected or supported.

FIG. 1 shows that the reductant is introduced into the exhaust gas conduit 12, while forming a spray cone 24, wherein the spray cone 24 is also called jet or spray which is at least substantially conical or frusto-conical. The spray cone 24 thus has a cone shape or is a cone, the central axis of which is denoted with 26 in FIG. 1. The central axis 26 is an imaginary straight line which coincides with the injection direction, in which the reductant is introduced and particularly injected into the exhaust gas conduit 12 at the feeding point 18 by means of the metering device 16. This means that the spray cone 24 expands away from the metering device 16 along the injection direction and thus along the central axis 26.

In the exhaust gas conduit 12, a first flow separation element 28 is arranged, by means of which the exhaust gas conduit 12 is divided or split into a first partial conduit 30 and a second partial conduit 32. A first partial flow of the exhaust gas, indicated by an arrow 34, can flow through the first partial conduit 30. A second partial flow of the exhaust gas, indicated by an arrow 36, can flow through the second partial conduit 32. This means that the exhaust gas, particularly an overall flow of the exhaust gas, is divided into the first partial flow and the second partial flow by means of the first flow separation element 28. The first flow separation element 28 has a conduit area 38, which expands in the flow direction of the second partial flow, and which is thus a first cone.

The first cone (first conduit area 38) is arranged coaxially to the central axis 26, and so the central axis of the first cone coincides with the central axis 26. Upstream of the first conduit area 38, the first flow separation element 28 has a wall area 40 which at least substantially runs vertically or perpendicularly to the central axis 26. The flow separation element 28, for example, is formed from sheet metal. Since the wall area 40 is arranged upstream of the first conduit area 38, the overall flow is initially divided by means of the wall area 40. The first partial conduit 30 is arranged on a first side 42 of the flow separation element 28, wherein the second partial conduit 32 is arranged on a second side 44 of the first flow separation element 28 which faces away from the first side 42.

In the area of the feeding point 18, the metering device 16 comprises, for example, a nozzle, by means of which the reductant is injected into the exhaust gas conduit 12 while forming a spray cone 24. The at least substantially vertical wall area 40, which is formed, for example, from sheet metal, allows particularly for the realization of an at least substantially symmetrical inflow at the nozzle or the feeding point 18.

In order to keep the risk of deposits of the reductant low or to prevent excessive deposits even at high metering rates, i.e., at high quantities of the reductant introduced into the exhaust gas conduit 12, a second flow separation element 46 is arranged in the second partial conduit 32, wherein the second flow separation element 46 can be formed from a metallic material or sheet metal. As shall be explained in more detail below, a further flow separation of the exhaust gas, particularly the second partial flow, is effected by the second flow separation element 46, and so a particularly advantageous processing of the reductant can be realized. Due to this processing, the reductant can be mixed particularly well with the exhaust gas, and so deposits of the reductant in the interior of the exhaust gas guide device can at least be kept low.

Due to the second flow separation element 46, the second partial conduit 32 is divided into a first sub-conduit 48, a second sub-conduit 50, and a third sub-conduit 52 which is arranged between the first sub-conduit 48 and the second sub-conduit 50. The sub-conduits 48, 50, and 52 are thus further partial conduits of the second partial conduit 32, wherein a first sub-flow can flow through the first sub-conduit 48, a second sub-flow can flow through the second sub-conduit 50, and a third sub-flow can flow through the third sub-conduit 52. This means that the second partial flow of the exhaust gas is further divided into the three sub-flows by means of the second flow separation element 46. As a result, the risk of deposits can be kept particularly low. The second flow separation element 46 comprises a second conduit area 54, through which the second and third sub-flow can flow and which expands in flow direction of the second and third sub-flow, and which is thus a second cone.

The first sub-flow is denoted with an arrow 56, wherein the second sub-flow is denoted with an arrow 58. The third sub-flow is denoted with an arrow 60. The first partial flow denoted with the arrow 34 is particularly used to protect the spray (spray cone 24) from a main stream. The first sub-flow, denoted with the arrow 56, is particularly used to prevent the spray from impinging on the first outer cone (first conduit area 38). The second sub-flow denoted with the arrow 58 is used to increase the impetus of the spray and to transport the spray out into the mixing pipe 14. The third sub-flow denoted with the arrow 60 is used to prevent the spray from impinging on the inner, second cone (second conduit area 54) and to increase the impetus of the spray (spray cone 24).

In order to keep the risk of deposits particularly low, the inner second cone—as can be seen in FIG. 1—is arranged at least to some extent in the outer first cone. In the present case, a partial area of the inner cone protrudes into the outer cone. The feeding point 18 is arranged in the second partial conduit 32 and in the present case in the second sub-conduit 50, wherein the spray penetrates the inner cone and extends into the outer cone.

FIG. 1 further shows that the central axis of the conduit area 54 also coincides with the central axis 26, and so the conduit areas 38 and 54 are arranged coaxially to one another and coaxially to the central axis 26. The second conduit area 54 expands in the injection direction of the spray (spray cone 24) and thus along the central axis 26 away from the metering device 16, similar to the first conduit area 38.

The first partial conduit 30 is delimited by a first surface area 62 of the first flow separation element 28 and a first part 64 of an inner side 66 of the exhaust gas guide element 10 which delimits the exhaust gas conduit 12, wherein the first part 64 faces the first surface area 62. The second partial conduit 32 is delimited by a second surface area 68 of the first flow separation element 28, wherein the second surface area 68 faces away from the first surface area 62, and a second part 70 of the inner side 66 of the exhaust gas guide element 10, wherein the second part 70 faces the second surface area 68.

The first sub-conduit 48 is delimited by a third part 72 of the second surface area 68 of the first flow separation element 28 and a third surface area 74 of the second flow separation element 46, which faces the third part 72. The third sub-conduit 52 is delimited by a fourth surface area 76 of the second flow separation element 46, wherein the fourth surface area 76 faces away from the third surface area 74, and a fifth surface area 78 of the second flow separation element 46, wherein the fifth surface element 78 faces the fourth surface area 76.

Furthermore, the second sub-conduit 50 is delimited by a sixth surface area 80 of the second flow separation element 46, wherein the sixth surface area faces away from the fifth surface area 78, and a partial area of the second part 70 of the inner side 66 of the exhaust gas guide element 10, wherein the partial area faces the sixth surface area 80.

Figure 2:
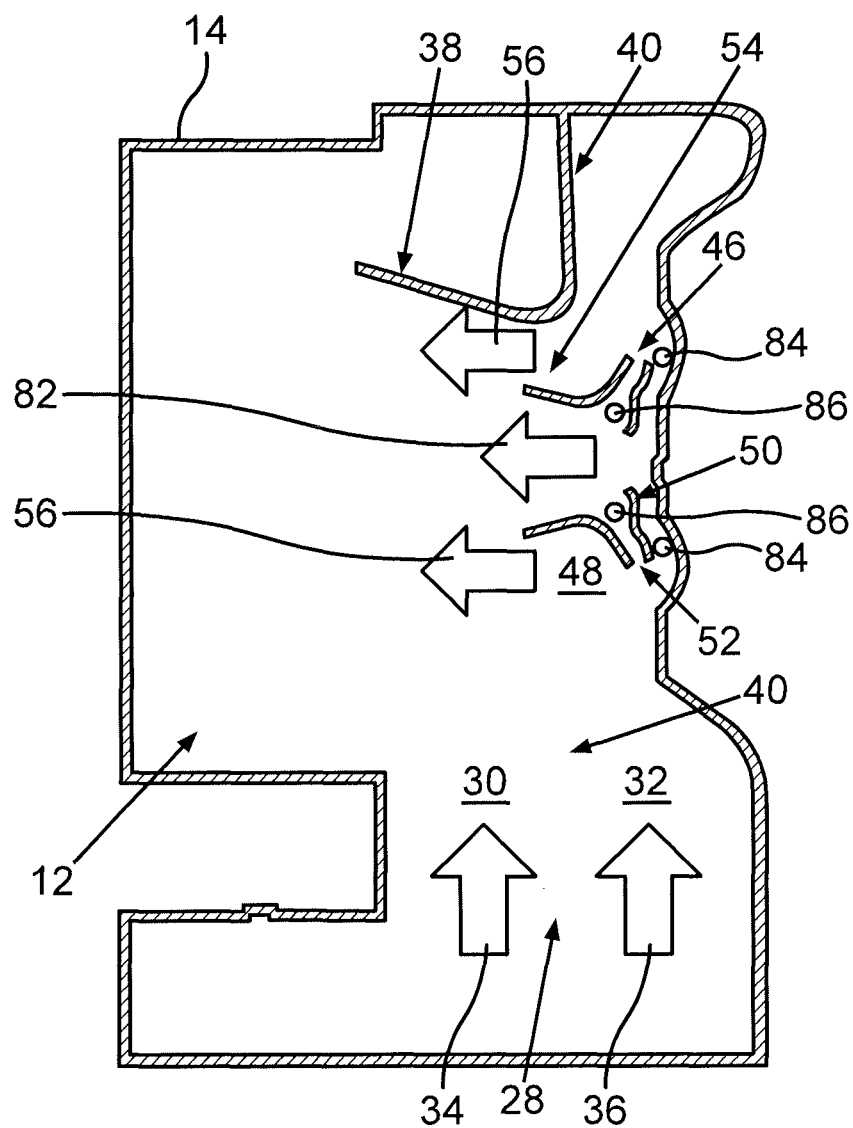
FIG. 2 shows a section of a further schematic cutaway view of the exhaust gas treatment device.

FIG. 2 shows a percentagewise division of the overall mass stream through the exhaust gas guide element 10. The share of the first partial flow in the overall mass stream, illustrated by the arrow 34, is at least 55 percent and no more than 75 percent. The share of the second partial flow in the overall mass stream, particularly the overall exhaust gas mass stream, illustrated by the arrow 36, is at least 25 percent and no more than 45 percent. The first sub-flow in FIG. 2 is denoted with the arrows 56. The share of the first sub-flow in the overall mass stream is at least 22 percent and no more than 40 percent. The share of a flow indicated in FIG. 2 with an arrow 82, which flows through the inner second cone, in the overall mass stream is, e.g., at least 2.5 and no more than 7.5 percent.

The second sub-flow in FIG. 2 is denoted with 84, wherein the share of the second sub-flow 84 in the overall mass stream is at least 0 percent and no more than 2 percent. The third sub-flow in FIG. 2 is denoted with 86, wherein the share of the third sub-flow 86 in the overall mass stream is at least 3 percent and no more than 6.5 percent.

Figure 3:
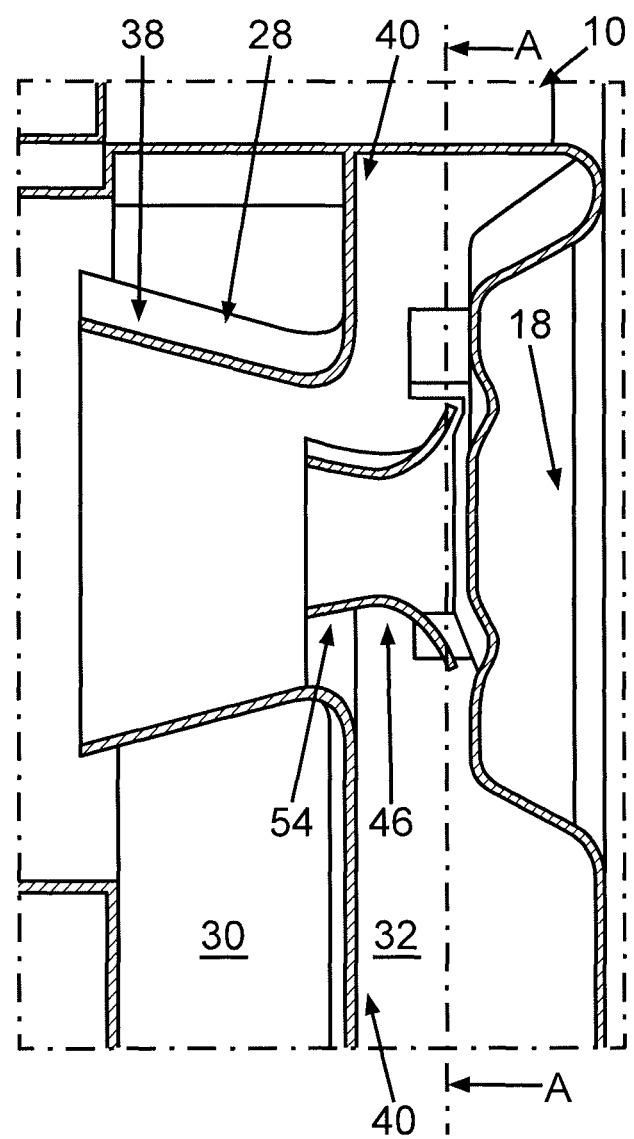
FIG. 3 shows a section of a further schematic cutaway view of the exhaust gas treatment device.
Figure 4:
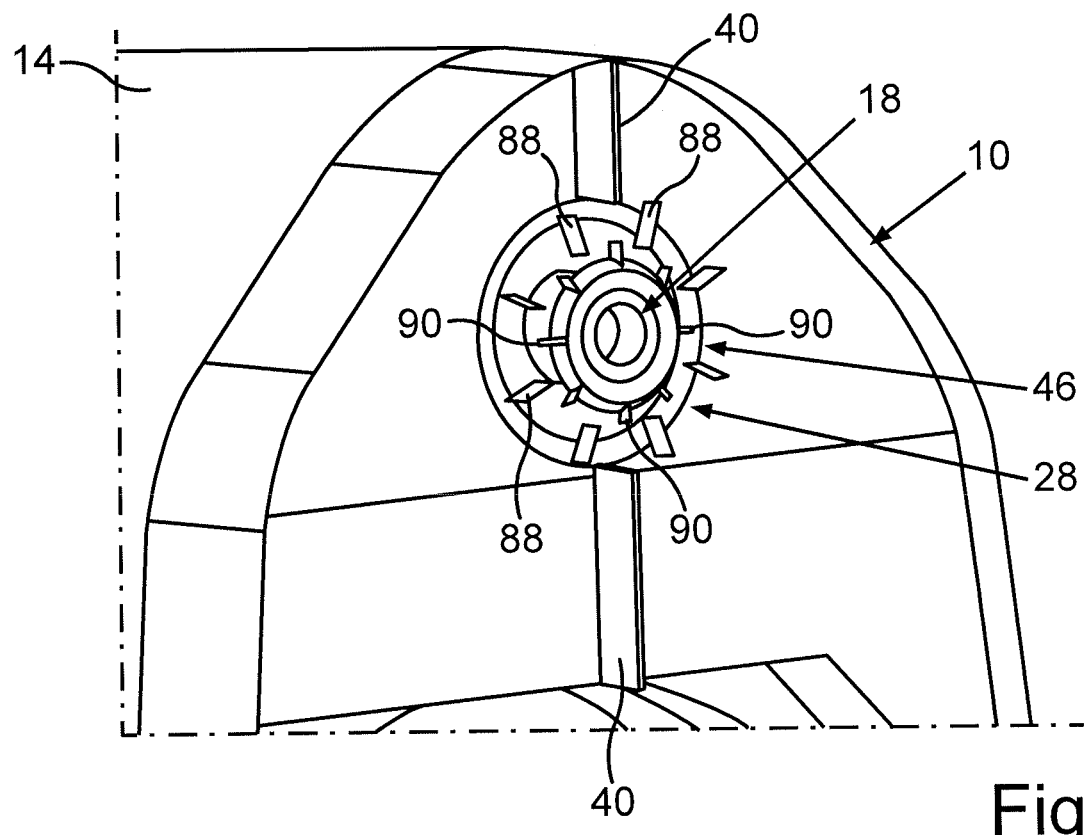
FIG. 4 shows a section of a schematic and perspective rear view of the exhaust gas treatment device.
Figure 5:
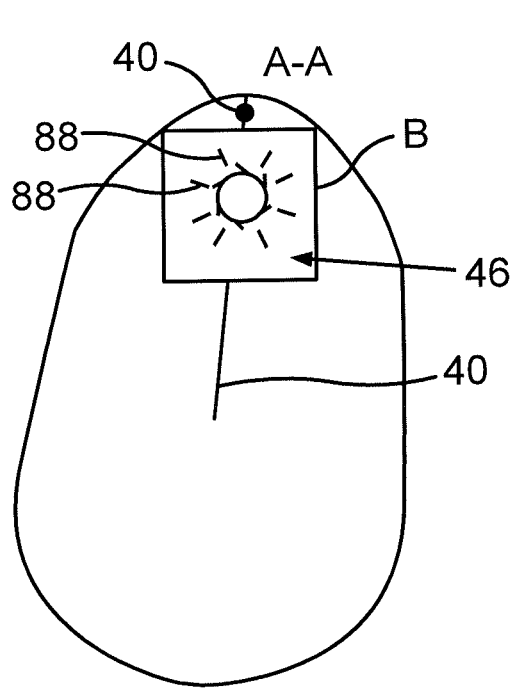
FIG. 5 shows a schematic cutaway view of the exhaust gas treatment device along a cutting line A-A shown in FIG. 4.
Figure 6:
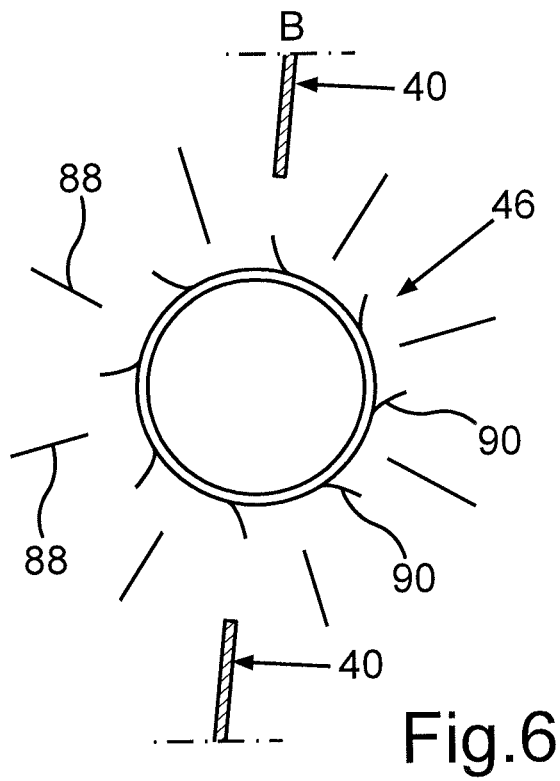
FIG. 6 shows a magnified depiction of an area of the exhaust gas treatment device denoted with B in FIG. 5.

FIG. 3 shows a section of a schematic cutaway view of the exhaust gas treatment device, wherein FIG. 3 shows a cutting line A-A. FIGS. 3 to 5 show particularly well the at least substantially vertical wall area 40, forming an at least substantially vertical metal sheet for realizing a symmetrical inflow at the nozzle. FIG. 6 shows a magnified view of an area, which is denoted with B in FIG. 5. As can be seen in FIGS. 4 to 6, straight guide elements in the form of straight blades 88 are associated with the third sub-conduit 52, the blades 88 making possible a realization of an at least substantially symmetrical inflow at the nozzle. In addition, curved guide elements in the form of curved blades 90 are provided, wherein the curved guide elements are, for example, associated with the second partial conduit 32 and particularly with the third sub-conduit 52 in order to realize a swirl-shaped flow or an at least substantially swirl-shaped flow of the exhaust gas in the inner second cone. The objective is that of preventing a detachment or a flow detachment in the inner second cone despite a large opening angle of the inner second cone.

Such an at least substantially swirl-shaped flow of the exhaust gas is shown in FIG. 8 in an area C. This swirl-shaped flow runs at least substantially spiral-shaped or helically around a longitudinal axis, which coincides with the main flow direction, in which the exhaust gas flows through the mixing pipe 14.

FIG. 8 further shows an area D, in which the exhaust gas is divided. In an area E, the flow of the exhaust gas is guided which is particularly effected by the second flow separation element 46. As a result, a partial flow can be generated at the nozzle in order to support the spray and to transport it away from the area near the nozzle without wetting the wall. A main flow can enter the mixing pipe 14, wherein a swirl can be applied to the main flow in order to achieve extensive wetting. As a result, a low surface load can be prevented on the inner side 66, and so an excessive drop in temperature can be prevented. Subsequently, the reductant can evaporate and excessive deposits can thus be prevented.

The second flow separation element 46 near the nozzle is thus particularly used to realize a partial flow near the nozzle, particularly in the form of a second sub-flow in order to rinse the nozzle itself and to increase the spray impetus in order to ensure that the reductant or its drops are transported in the direction of the mixing pipe 14. Here, a further second flow separation (not depicted) can take place. The first and/or third sub-flow is used to realize a shell around the spray (spray cone 24) in order to ensure that the outer first cone is not wetted. Flow detachments at corresponding inner walls of the two cones are preferably to be avoided, wherein an adjoining flow parallel to the corresponding inner walls is intended. As a result, drops can be transported away and a wetting of the wall can be prevented. Furthermore, the heat input into the walls can be increased in order to ensure evaporation of the reductant in case of wetting.

Figure 7A:
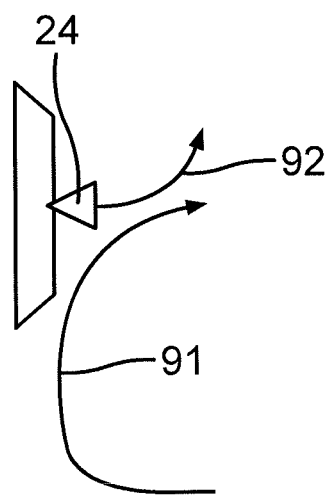
FIGS. 7a-e each show a section of a schematic cutaway view of the exhaust gas treatment device for illustrating the functions of the flow separation elements.

FIGS. 7*a-e* each show schematic cutaway views of the exhaust gas treatment device in order to illustrate each of its functions. FIG. 7*a* illustrates the flow of the exhaust gas without any flow separation element and guide element. The flow of the exhaust gas is illustrated in FIG. 7*a* with an arrow 91, wherein an arrow 92 shows the flow of the reductant.

Figure 7B:
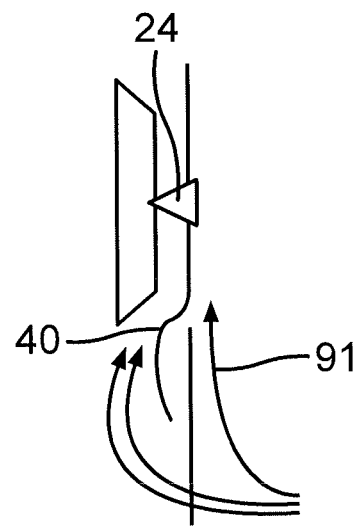

In FIG. 7*b*, the wall area 40 is provided, with which the exhaust gas or its flow can be divided, wherein the flow of the exhaust gas is shown in FIG. 7*b* by means of arrows 91.

Figure 7C:
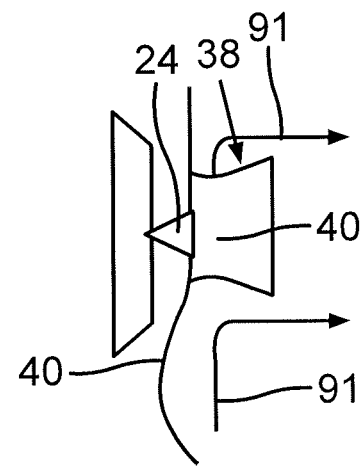

FIG. 7*c* shows the exhaust gas treatment device with the first outer cone (first flow separation element 28), wherein the outer cone protects the spray from the exhaust gas flow.

Figure 7D:
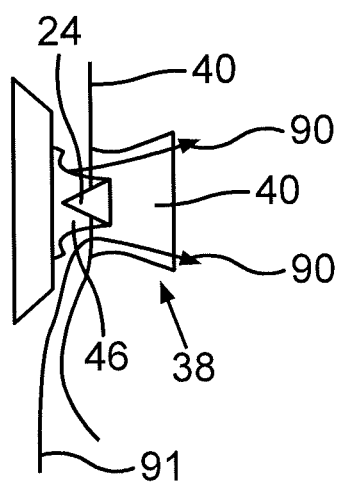
Figure 7E:
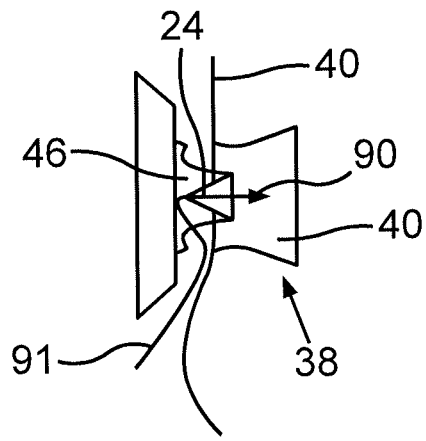

FIG. 7*d* shows the function of the inner cone (second flow separation element 46). The inner cone protects the spray from a lateral support flow. FIG. 7*e* further shows that the inner cone guides the flow in order to support the spray (spray cone 24) from the rear.

Figure 9:
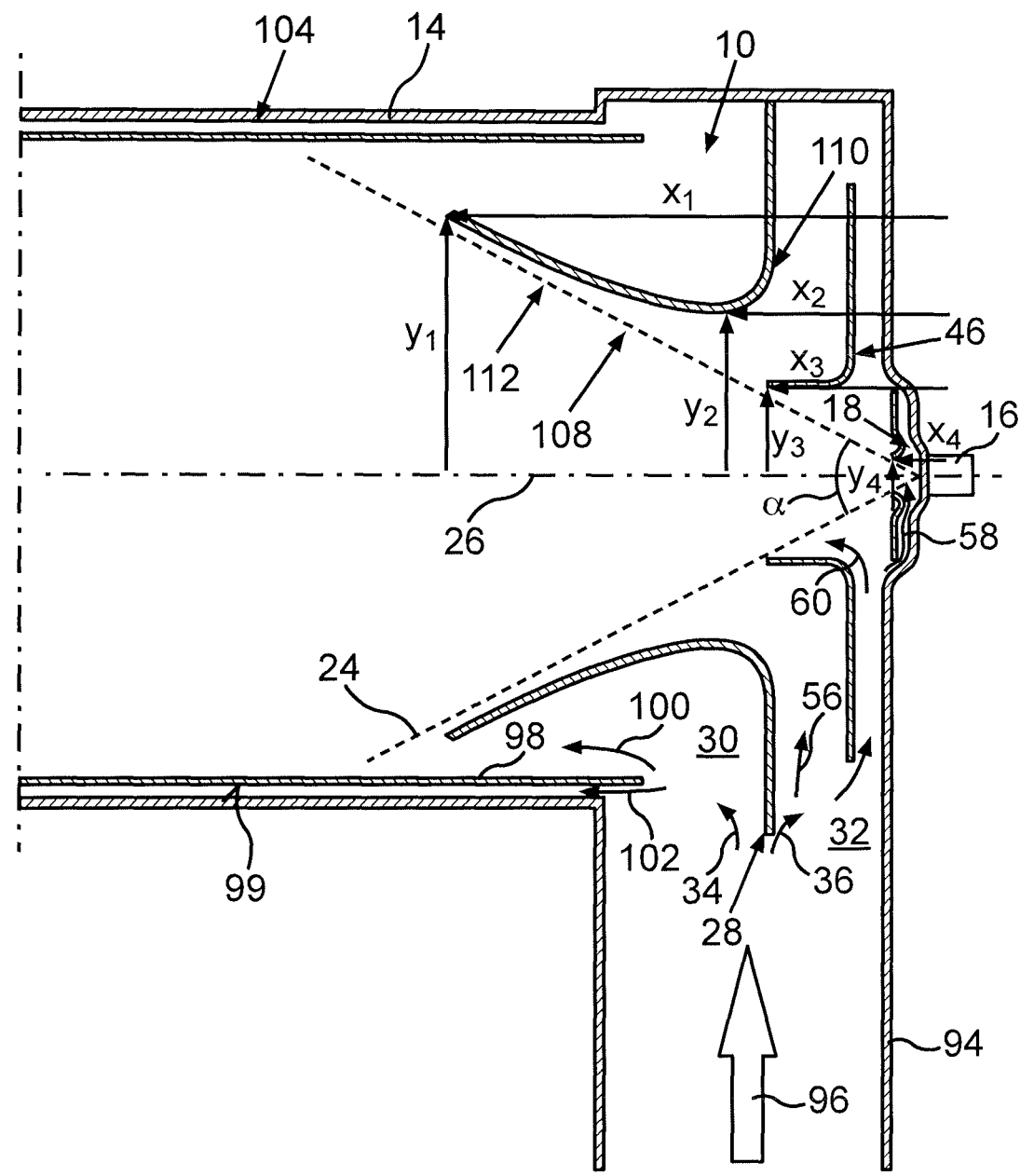
FIG. 9 shows a section of a schematic cutaway view of the exhaust gas treatment device according to a second embodiment.

FIG. 9 shows a section of a schematic cutaway view of a second embodiment of the exhaust gas treatment device. It can be seen in FIG. 9 that the exhaust gas is fed to the flow separation elements 28 and 46 by means of an exhaust gas pipe 94, wherein in FIG. 9, a flow of the exhaust gas through the exhaust gas pipe 94 is indicated by an arrow 96. As the arrows 34 and 36 in FIG. 9 indicate, the flow of the exhaust gas indicated by the arrow 96 is divided by means of the flow separation element 28 into the first partial flow indicated by the arrow 34 and into the second partial flow indicated by the arrow 36.

FIG. 9 further shows particularly well that the spray cone 24, the cone angle of which is denoted with a in FIG. 9, is introduced or injected into the exhaust gas conduit 10, particularly into the third sub-conduit 52. For that purpose, for example, the metering device 16, which is also called metering module, comprises a nozzle, by means of which the spray cone 24 is introduced, particularly injected, into the exhaust gas conduit 10.

In order to realize a particularly advantageous mixing, it is provided in the exhaust gas treatment device that the flow separation elements 28 and 46 are arranged entirely outside of the spray cone 24, wherein the cone angle α is at least 25 degrees, preferably more than 25 degrees. In particular, the cone angle lies in a range from 25 degrees to 120 degrees inclusively.

Since the flow separation elements 28 and 46 are arranged in the exhaust gas conduit 10, the flow separation elements 28 and 46 are designed as installations. The geometrical dimensions of the installations are selected such that none of the flow separation elements 28 and 46 lies within the actual spray cone 24, thus not colliding with the spray cone 24. The actual spray cone 24 is the spray cone that is actually introduced or injected into the exhaust gas conduit 10 by means of the metering device 16.

In FIG. 9, the dimensions of the installations are denoted with x1, x2, x3, x4, y1, y2, y3, and y4, wherein, with regard to the cone angle α, the following applies to these dimensions:

$$y1/x1 > \tan(\alpha/2)$$

$$y2/x2 > \tan(\alpha/2)$$

$$y3/x3 > \tan(\alpha/2)$$

$$y4/x4 > \tan(\alpha/2)$$

In order to ensure that the flow separation element 46 in the second embodiment does not protrude into the spray cone 24, the flow separation element 46 in the second embodiment is, when compared to the first embodiment, shortened in axial direction, particularly toward the metering device 16. For example, in the first embodiment, it is further provided that the second flow separation element 46 or the third sub-conduit 52, particularly in flow direction of the exhaust gas through the third sub-conduit 52, is designed at least substantially so as to be conical or frusto-conical and to expand in flow direction of the exhaust gas. However, in the second embodiment, the flow separation element 46 or the third sub-conduit 52 is designed at least substantially so as to be cylindrical, particularly with regard to the central axis 26.

Optionally, the second embodiment is further provided with a further flow division, which is realized by means of a separation element 98. The separation element 98 is, for example designed as a pipe which, for example, is at least to some extent arranged in the mixing pipe 14 or the exhaust conduit 12. As a result, for example, a pipe-in-pipe solution is provided. By means of the separation element 98, the first partial flow of the exhaust gas, indicated by the arrow 34, is divided into a fourth sub-flow, indicated by the arrow 100, and a fifth sub-flow, indicated by the arrow 102. The fourth sub-flow flows on the inside of the separation element 98 and thus along an inner side of the separation element 98, which faces away from the mixing pipe 14, wherein the fifth sub-flow flows along the outer side of the separation element 98 and thus along an outer side of the separation element 98, which faces the mixing pipe 14. Since the separation element 98 is spaced apart from the mixing pipe 14, the mixing pipe 14 and the separation element 98 form an annular gap 104, through which the fifth sub-flow flows. In its radial direction, the annular gap 104 is delimited inwardly by a lateral surface 99 of the separation element 98 on the side of its outer circumference, and it is particularly functional if it has an extension, particularly in radial direction, which lies in a range from three millimeters to 20 millimeters inclusively. In other words, the annular gap preferably has a width which lies in a range from 3 millimeters to 20 millimeters inclusively. The division of the second partial flow effected or effectable by means of the separation element 98 thus results in overall five sub-flows or partial flows, and so a particularly advantageous mixing can be realized.

On its inner side, the first flow separation element 28 further comprises a contour of a diffusor 108, having a first longitudinal area 110, which tapers in the flow direction of the second partial flow, and a second longitudinal area 112, which is adjacent and expanding in flow direction.

Figure 10:
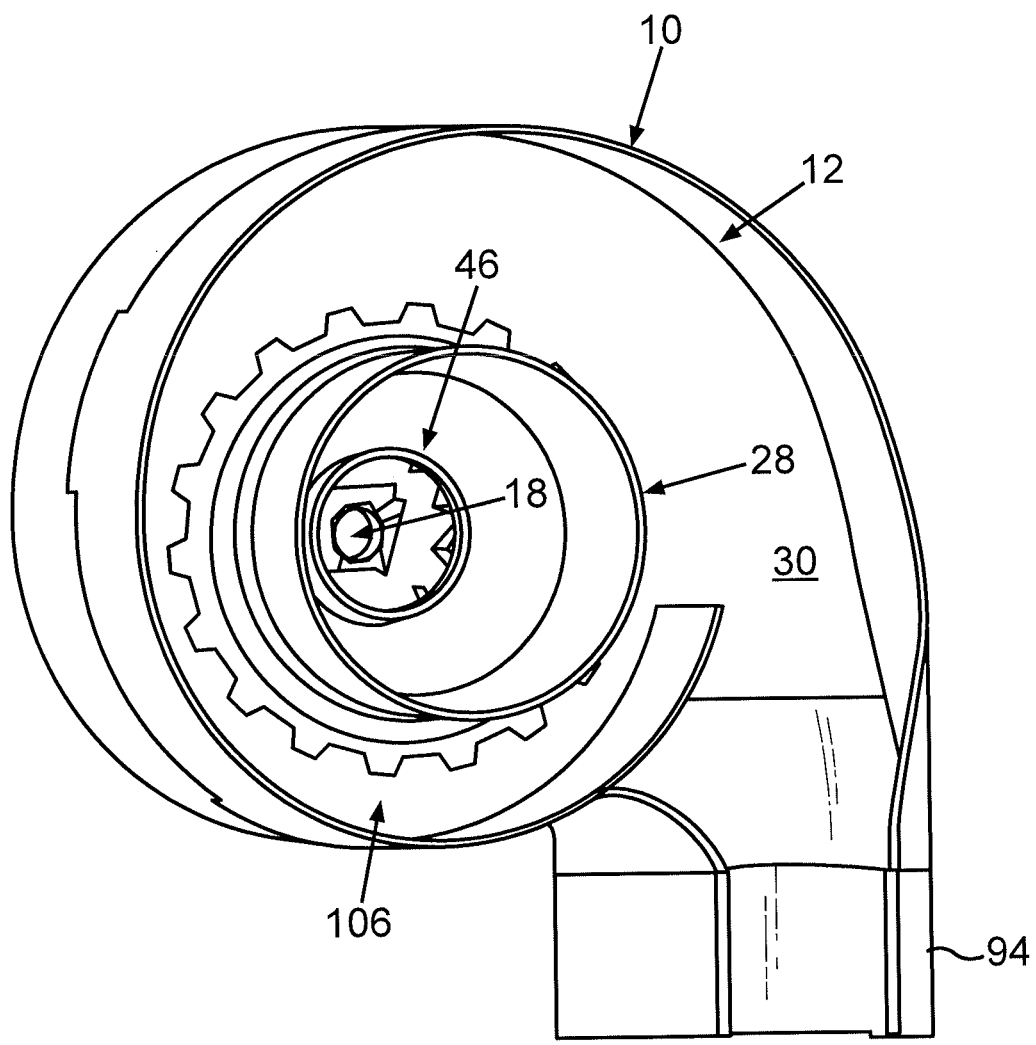
FIG. 10 shows a section of a schematic perspective view of the exhaust gas treatment device according to a third embodiment.

FIG. 10 shows a section of a schematic and sectional perspective view of a third embodiment of the exhaust gas treatment device or the exhaust gas treatment element 10. In the third embodiment, at least one part of the exhaust gas conduit 12, through which the exhaust gas can flow, runs in a volute-shaped manner and thus in a spiral-shaped or helical manner. In particular, it is conceivable that at least one of the partial conduits 30 and 32 and/or at least one of the sub-conduits 48, 50, and 52 runs in a volute-shaped manner. It is further conceivable that with the described division effected by the separation element 98, two further sub-conduits are created, and so alternatively or additionally, one of the further sub-conduits runs at least substantially in a volute-shaped and thus helical or spiral-shaped manner. Due to this volute-shaped design of at least one part of the exhaust gas conduit, this volute-shaped part of the exhaust gas channel tapers in the direction of the central axis 26 and inwardly. In other words, in the third embodiment, at least one part of the exhaust gas treatment element and thus at least one part of the exhaust gas conduit 12 has the geometric contour or form of a volute. This volute can be seen particularly well in FIG. 10 and is denoted with 106, wherein the volute 106 is, for example, the partial conduit 30 provided in the first embodiment.

LIST OF REFERENCE SIGNS

10 Exhaust gas guide element
12 Exhaust gas conduit
14 Mixing pipe
16 Metering device
18 Feeding point
20 Particle filter
22 Collecting chamber
24 Spray
26 Central axis
28 First flow separation element
30 First partial conduit
32 Second partial conduit 34 Arrow
36 Arrow
38 First conduit area
40 Wall area
42 First side
44 Second side
46 Second flow separation element
48 First sub-conduit
50 Second sub-conduit
52 Third sub-conduit
54 Second conduit area
56 Arrow
58 Arrow
60 Arrow
62 First surface area
64 First part
66 Inner side
68 Second surface area
70 Second part
72 Third part
74 Third surface area
76 Fourth surface area
78 Fifth surface area
80 Sixth surface area
82 Arrow
84 Second sub-flow
86 Third sub-flow
88 Straight blades
90 Curved blades
91 Arrow
92 Arrow
94 Exhaust gas pipe
96 Arrow
98 Separation element
100 Arrow
102 Arrow
104 Annular gap
106 Volute
B Area
C Area
D Area
E Area

The invention claimed is:

1. An exhaust gas treatment device for an internal combustion engine of a motor vehicle, comprising:
   an exhaust gas guide element which has an exhaust gas conduit through which exhaust gas of the internal combustion engine is flowable;
   a metering device, wherein a reductant for denitrifying the exhaust gas is introducible into the exhaust gas conduit at a feeding point by the metering device;
   a first flow separation element disposed in the exhaust gas conduit that divides the exhaust gas conduit into a first partial conduit through which a first partial flow of the exhaust gas is flowable and a second partial conduit through which a second partial flow of the exhaust gas is flowable and in which the feeding point is disposed, wherein the first flow separation element has a first conduit area through which the second partial flow is flowable and which expands in a flow direction of the second partial flow; and
   a second flow separation element disposed in the second partial conduit;
   wherein the second flow separation element divides the second partial conduit into a first sub-conduit through which a first sub-flow of the exhaust gas is flowable, a second sub-conduit through which a second sub-flow of the exhaust gas is flowable, and a third sub-conduit through which a third sub-flow of the exhaust gas is flowable and which is disposed between the first sub-conduit and the second sub-conduit;
   wherein the second flow separation element has a second conduit area through which the second sub-flow and the third sub-flow are flowable and which is cylindrical or expands in a flow direction of the second sub-flow and the third sub-flow;
   wherein the first conduit area of the first flow separation element expands along an injection direction of the reductant.

2. The exhaust gas treatment device according to claim 1, wherein the reductant is introduced into the exhaust gas conduit by the metering device and forms a spray cone, wherein a cone angle of the spray cone is at least 20 degrees, and wherein the first flow separation element and the second flow separation element are disposed entirely outside of the spray cone.

3. The exhaust gas treatment device according to claim 1, wherein at least one part of the exhaust gas conduit through which the exhaust gas is flowable runs in a volute-shaped manner.

4. The exhaust gas treatment device according to claim 1, wherein the reductant is introducible in the injection direction into the second partial conduit and wherein the first conduit area and the second conduit area each expand along the injection direction.

5. The exhaust gas treatment device according to claim 4, wherein the reductant, while forming a spray cone, is introducible into the second partial conduit along an imaginary straight line which coincides with the injection direction and wherein the first conduit area and the second conduit area each are arranged coaxially to the imaginary straight line.

6. The exhaust gas treatment device according to claim 1, wherein the first partial conduit is delimited by a first surface area of the first flow separation element and a first part, facing the first surface area, of an inner side of the exhaust gas guide element, wherein the second partial conduit is delimited by a second surface area of the first flow separation element, which faces away from the first surface area, and a second part, facing the second surface area, of the inner side of the exhaust gas guide element.

7. The exhaust gas treatment device according to claim 6, wherein the first sub-conduit is delimited by a third part of the second surface area of the first flow separation element, and a third surface area of the second flow separation element, which faces the third par, wherein the third sub-conduit is delimited by a fourth surface area of the second flow separation element, which faces away from the third surface area, and a fifth surface area of the second flow separation element, which faces the fourth surface area.

8. The exhaust gas treatment device according to claim 7, wherein the second sub-conduit is delimited by a sixth surface area of the second flow separation element, which faces away from the fifth surface area, and a partial area of the second part, facing the sixth surface area, of the inner side of the exhaust gas guide element.

9. The exhaust gas treatment device according to claim 1, wherein straight guide elements for guiding the exhaust gas are associated with the third sub-conduit.

10. The exhaust gas treatment device according to claim 1, further comprising curved guide elements, wherein the curved guide elements effect a swirl-shaped flow of at least one part of the exhaust gas.

11. The exhaust gas treatment device according to claim 1, wherein at least one of the first flow separation element and the second flow separation element has on an inner side a contour of a diffusor having a first longitudinal area which tapers in a flow direction of a corresponding partial flow or a sub-flow and, adjacent to the first longitudinal area, a second longitudinal area which expands in the flow direction.

* * * * *